July 8, 1969  H. H. KAEMMER  3,454,045
VALVE OPERATED BY FLUIDIC DEVICE
Filed March 10, 1967  Sheet 1 of 2

INVENTOR:
HERBERT H. KAEMMER
BY
Breitenfeld & Levine
ATTORNEYS

INVENTOR:
HERBERT H. KAEMMER
BY
ATTORNEYS

United States Patent Office 3,454,045
Patented July 8, 1969

3,454,045
VALVE OPERATED BY FLUIDIC DEVICE
Herbert H. Kaemmer, Whippany, N.J., assignor to Automatic Switch Company, a corporation of New York
Filed Mar. 10, 1967, Ser. No. 622,265
Int. Cl. F16k *11/02, 31/145;* F15c *1/08*
U.S. Cl. 137—596.18               7 Claims

ABSTRACT OF THE DISCLOSURE

Valve body has two valve chambers each of which has two orifices communicating with a pressure and an exhaust port for high pressure working fluid. Valve member in each chamber moves alternatively to close one orifice or the other, in response to movement of a diaphragm. One face of each diaphragm connected to its respective valve member by a pin, and other face of diaphragm connected to outlet of a fluidic device.

---

This invention relates to valves, and more particularly to a valve of "interface" nature, i.e., a valve adapted to control the flow of relatively high pressure fluid in response to relatively low pressure fluid signals from a fluidic device.

As is known, fluidic devices use the flow of fluids through tiny circuits to perform the functions of sensing, amplification, and control. For example, a fluid amplifier may include an inlet port connected to a fluid supply, a splitter or attenuated obstruction in the path of the inlet jet separating two outlet ports, and a control port on each side of the inlet jet. By applying a slight bias pressure through one control port or the other, the inlet jet can be caused to flow through one or the other by the outlet ports.

If it is desired to employ a fluidic device, such as a fluid amplifier, to control the flow of a higher pressure "working" fluid, a so-called "interface" device must be employed. An interface device accepts a low pressure, low volume fluid flow signal, usually air, from a fluidic device. In response to this input, the interface device controls the flow of a higher pressure working fluid, such as air, hydraulic fluid, or steam, employed to operate conventional fluid power devices, such as cylinders and diaphragms.

It is an object of this invention to provide an interface valve having few moving parts, and consequently a long useful life.

It is another object of the invention to provide such a valve in which each valve member serving to control the working fluid is operated by a diaphragm subject to the low pressure signal fluid.

It is a further object of the invention to provide such a valve wherein the working fluid serves to cushion the moving parts of the valve and thereby helps prolong their life.

It is an additional object of the invention to provide such a valve wherein the working fluid is employed momentarily, during shifting of the valve to exhaust the fluid power device being controlled, to help speed the operation of the valve.

It is another object of the invention to provide such a valve which incorporates no springs, and uses light weight parts, so that no inertia, momentum, or harmonic problems are encounted when using the valve.

To achieve these objects, the invention provides a valve body formed with at least one valve chamber, and two orifices leading into the chamber on its opposite sides. One orifice communicates with a pressure port for the high pressure working fluid, and the other communicates with an exhaust port. A third port in the chamber communicates with the fluid power device being controlled. A valve member within the chamber is movable between the orifices to alternatively close one or the other. A rigid stem extends between one face of a diaphragm, within a diaphragm chamber, and the valve member. The region of the diaphragm chamber adjacent to the other face of the diaphragm is adapted to be connected to one outlet port of a digital fluidic device, i.e., a device which renders either an "on" or an "off" signal. The area of the diaphragm is much larger than the area of the valve member, and hence a relatively low pressure fluid signal can control the flow of a much higher pressure working fluid.

Additional features of the invention will be found in the following detailed description of the invention, in which reference is made to the accompanying drawings.

Figure 1:
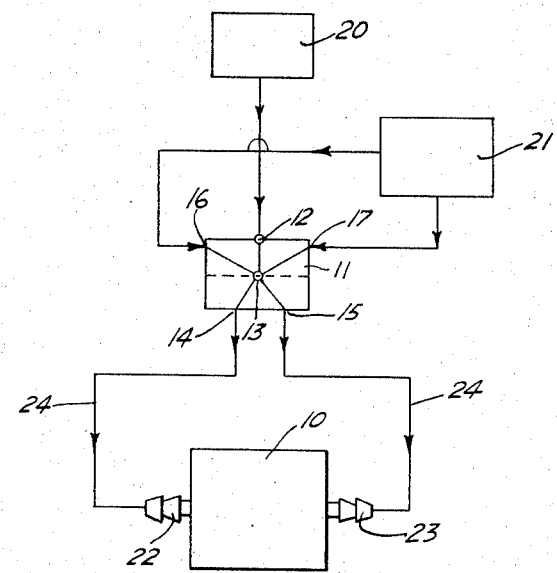
FIG. 1 is a schematic diagram of a fluidic circuit arranged to operate a valve according to this invention.

A valve 10 according to this invention is intended to be operated by a fluidic circuit, as illustrated in FIG. 1, which may include a fluid amplifier 11 capable of rendering a digital signal. The fluid amplifier may have an inlet port 12, a splitter 13 in the path of the inlet jet, and between two outlet ports 14 and 15, and two control ports 16 and 17. Air to provide the inlet jet may be supplied to the inlet port 12 from any suitable source 20. Bias pressure at the control ports 16 and 17 may be provided by any suitable means 21, such as push buttons, sensing devices, or level detectors. Thus, when bias pressure is applied to, say, control port 17, the inlet jet from port 12 will be shifted to outlet port 14, whereby a pressure signal will be present at outlet port 14, and no signal will be present at outlet port 15. On the other hand, application of bias pressure to control port 16 will shift the output signal of the amplifier 11 to the outlet port 15, leaving no signal at outlet port 14. The fluid signals from the outlet ports 14 and 15 are transmitted to connections 22 and 23, respectively, of the valve 10 by suitable conduits 24, such as plastic tubing.

The valve chosen to illustrate this invention, and shown in FIGS. 2–5, comprises generally a valve body 25, bonnets 26 and 27 on the opposite ends of the body, and covers 30 and 31 on the outside of each bonnet, the assembly being held together by four screws 32 the ends of which are threadably engaged by nuts 33. The valve body is provided with an inlet port 34 and an exhaust port 35. The ports 34 and 35 may be internally threaded for connection to a source of relatively high pressure working fluid, and to a low pressure exhaust region, respectively.

Each end of the valve body 25 is formed with a stepped contour, each step having an annular shape. The innermost portions of the contours define cylindrical cavities which together with the adjacent bonnets define valve chambers. Thus, the inner end of bonnet 26 forms one wall of a valve chamber 36, the remainder of the chamber being formed by the cavity in the valve body, and the inner end of bonnet 27 forms one wall of a valve chamber 37. At each end of the valve body, the inner end of the bonnet abuts the first step of the body contour, and an O-ring 40 is squeezed between the bonnet and body to provide a seal for the valve chamber which it surrounds. Each bonnet is spaced from the second step of the body contour, to define an annular passageway 41, but another O-ring 42 is squeezed between each bonnet and the third step of the body contour to provide a seal for the passageway 41. The outer face of each bonnet is formed with a cavity which together with its respective cover defines a diaphragm chamber. Thus, the bonnet 26 and cover 30 define a diaphragm chamber 43 between them, and the bonnet 27 and cover 31 define a diaphragm chamber 44 between them.

At the center of the valve body 25 is a passageway 45 extending between the valve chambers 36 and 37, the passageway 45 terminating in orifices in the inner walls of the two valve chambers. The passageway 45 communicates with the inlet port 34 via a passageway 46, thus establishing communication between the inlet port 34 and the valve chambers 36 and 37. The opposite wall of each valve chamber is also provided with an orifice defined by the terminal of an opening or bore 47 formed in each bonnet and extending between each pair of valve and diaphragm chambers. The exhaust port 35 communicates with the annular passageways 41 via passageways 50, which in turn communicate with the bore 47 through passageways 51, thus establishing communication between the exhaust port 35 and the valve chambers 36 and 37.

Figure 2:
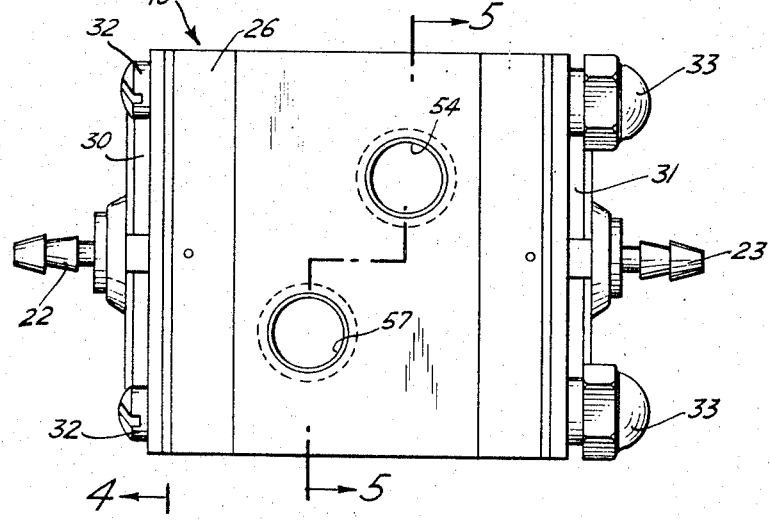
FIG. 2 is a side elevational view of the valve.
Figure 3:
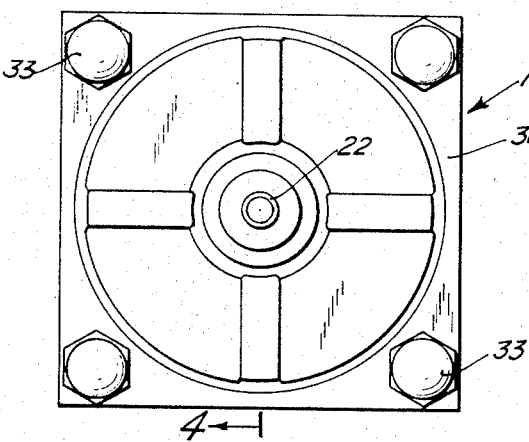
FIG. 3 is an end elevational view of the valve.
Figure 5:
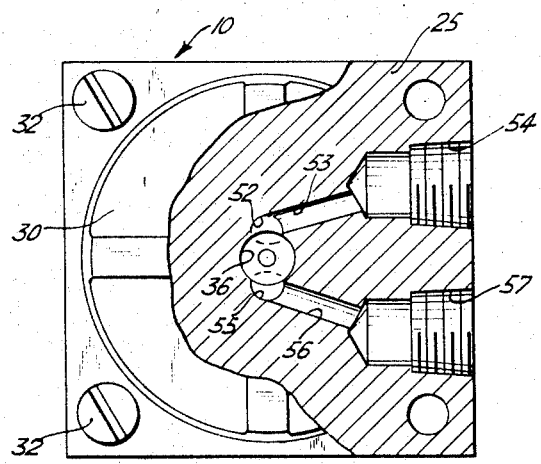
FIG. 5 is a cross-sectional view taken along line 5—5 of FIG. 2.

The valve chamber 36 is provided with a third orifice 52 communicating via a passageway 53 (FIG. 5) with an outlet port 54 (FIGS. 2 and 5). Similarly, the valve chamber 37 is provided with a third orifice 55 communicating with an outlet port 57 via a passageway 56. The outlet ports may be internally threaded for connection to a fluid power device such as a cylinder.

Within the valve chambers 36 and 37 are valve members 60 and 61, respectively. Each valve member comprises a disk of rigid material carrying an annular member 62 of resilient material on each of its faces, the resilient material projecting out of the plane of the disk face in which it is carried. The resilient annular members are adapted to engage the flat wall areas, which may be thought of as valve seats, surrounding the opposed orifices of each valve chamber and thereby close the orifices. Thus, when the valve members are in the position shown in FIG. 4, the orifice of valve chamber 36 which communicates with the exhaust port 35 is closed, and the orifice of valve chamber 37 which communicates with the inlet or pressure port 34 is closed. Alternatively, the valve members may be moved toward the right in FIG. 4 to close the opposite orifice of each valve chamber.

Movement of the valve members 60 and 61 is effected by means of diaphragms 63 and 64, respectively. The marginal region of diaphragm 63 is sandwiched between bonnet 26 and cover 30, and likewise the marginal region of diaphragm 64 is sandwiched between bonnet 27 and cover 31. The diaphragms are formed of a suitable flexible material, such as rubber, and a rigid back-up plate 65 is secured, as by adhesive, to the central region of the inner face of each diaphragm. The movement of each diaphragm is transmitted to its associated valve member by a stem or pin 66 extending through the bore 47 and secured to the valve member at one end and abutting against the back-up plate at the other. The outer diameter of each stem 66 varies along its length, but throughout its length the diameter is considerably smaller than the diameter of the bore 47, to permit free movement of the stem.

Figure 4:
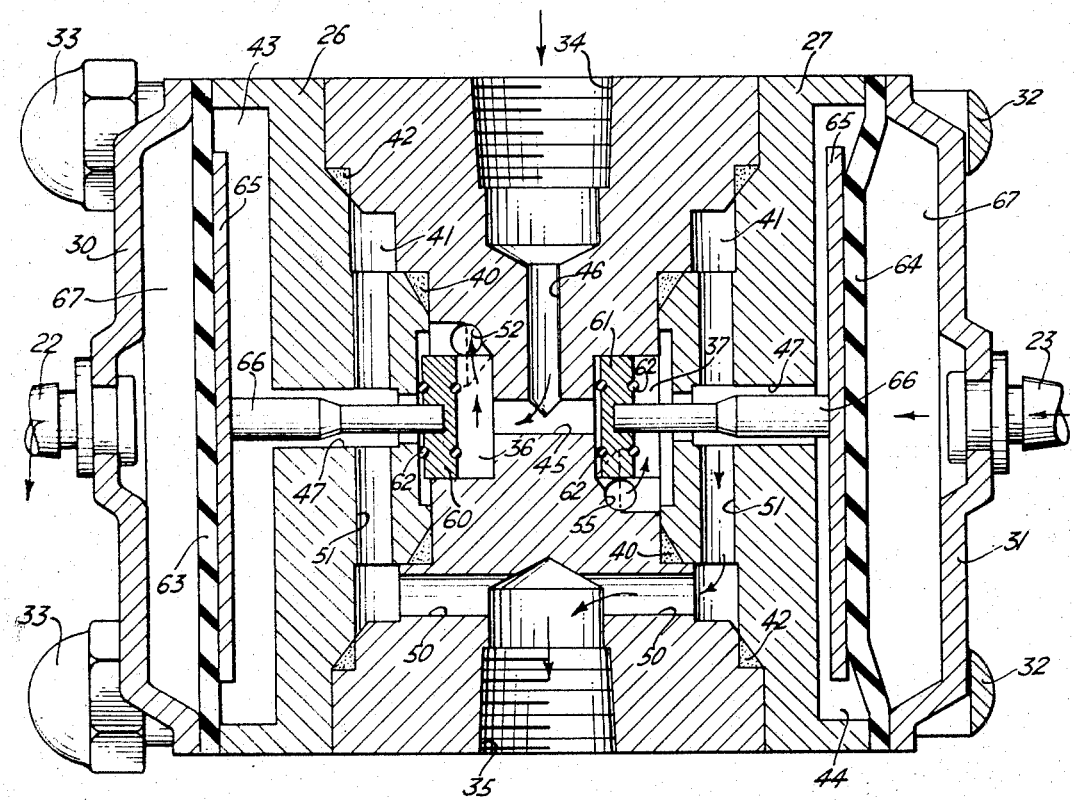
FIG. 4 is a cross-sectional view, on an enlarged scale, taken along line 4—4 of FIG. 3.

The operation of the valve 10 is as follows: assuming a bias pressure is applied to the control port 16 of fluid amplifier 11, a fluid signal will emanate from the outlet port 15, and no signal will appear at outlet port 14. Consequently, a fluid pressure is transmitted to the region 67 of diaphragm chamber 44, and urges the diaphragm 64 toward the left, as shown in FIG. 4. Movement of the diaphragm is transmitted, via the stem 66, to valve member 61 with the result that the resilient member 62 carried on the inner face of the valve member is pressed against the inner wall or valve seat of the valve chamber 37 to close the orifice in that valve chamber which communicates with the working pressure inlet port 34. This action is made possible, despite the fact that the pressure of the working fluid is much greater than the signal fluid, by virtue of the greater area of the diaphragm with respect to the area of the valve member. For example, the diaphragm area may be one hundred times the size of the valve member area, whereby the fluid signal pressure from the outlet of the amplifier 11 need be only 1/100 of the pressure of the working fluid.

Movement of the valve member 61 to the position shown in FIG. 4 permits the exhaust port 35 to communicate, via the passageways 50, 41 and 47, the valve chamber 37, the orifice 55, and the passageway 56, with the outlet port 57.

On the other side of the valve, since there is, relatively speaking, no pressure in the region 67 of diaphragm chamber 43, the working fluid pressure from port 34 is permitted to enter the valve chamber 36, via passageways 46 and 45, and press the resilient member 62 on the outer face of the valve member 60 against the outer wall or valve seat of the valve chamber 36 to close the orifice which communicates with the exhaust port 35. Consequently, the high pressure working fluid is permitted to travel to the outlet port 54 via orifice 52 and passageway 53.

Should the bias pressure at control port 16 be relieved, and applied instead to control port 17, the valve members 60 and 61 will obviously move toward the right in FIG. 4, resulting in the working fluid pressure appearing at outlet port 57, and the outlet port 54 communicating with the exhaust port 35.

It will be appreciated that during the short period of movement of either valve member from the inner wall of its valve chamber toward the outer wall, some of the high pressure working fluid will flow around the valve member and through its respective opening or bore 47. Thus, working fluid pressure is momentarily applied to the inner face of the associated diaphragm urging the latter outwardly, helping to exhaust the region 67. Consequently, the response of the valve is accelerated. Furthermore, since working fluid is moving through the opening 47 during the movement fo the parts, the stem 66 is cushioned thereby decreasing wear on this part.

As mentioned above, the working fluid pressure will be much greater than the signal fluid pressure, say one hundred times as great. Furthermore, the bias pressure at the control ports need be only 10-15% of the signal fluid pressure. Hence, it will be appreciated that a combination of the present valve with a fluid amplifier permits control of working fluid by control pressures which are a tiny fraction of the working fluid pressure.

What is claimed is:

1. A valve adapted to control the flow of a relatively high pressure working fluid in response to the relatively low pressure output of a fluid amplifier, comprising a valve body formed with at least one valve chamber, a pressure orifice and an exhaust orifice leading into said chamber on opposite sides thereof, pressure and exhaust ports for the working fluid communicating with said pressure and exhaust orifices, respectively, a third port communicating with said chamber, a valve seat within said chamber surrounding each of said orifices, a single valve member within said chamber movable alternatively into engagement with one of said valve seats or the other, a single diaphragm chamber, a diaphragm within said diaphragm chamber, rigid means extending between one face of said diaphragm and the side of said valve member facing the orifice which communicates with said exhaust port, and means for connecting the region of said diaphragm chamber adjacent to the other face of said diaphragm to a fluid amplifier outlet.

2. A valve as defined in claim 1 wherein there are two valve chambers, the orifices communicating with said pressure port leading into said chambers from the region of said valve body between said chambers, a diaphragm chamber at each end of said valve body, each of said valve chambers being located between one of said diaphragm chambers and said region of said valve body, a single diaphragm within each of said diaphragm chambers, rigid means extending between one face of each diaphragm and the single valve member within the valve chamber closer to it, and means for connecting the regions of said diaphragm chambers adjacent to the other face of their respective diaphragms to different fluid amplifier outlets, whereby one of said diaphragm chambers may be pressurized while the other is exhausted.

3. A valve as defined in claim 1 wherein said diaphragm is formed of flexible material, and including a rigid back-up plate secured to said one face of said diaphragm, and wherein said rigid connecting means is a pin extending between said diaphragm and valve member.

4. A valve adapted to control the flow of a relatively high pressure working fluid in response to the relatively low pressure output of a fluid amplifier, comprising a valve body formed with at least one valve chamber, a pressure orifice and an exhaust orifice leading into said chamber on opposite sides thereof, pressure and exhaust ports for the working fluid communicating with said pressure and exhaust orifices, respectively, a third port communicating with said chamber, a valve seat within said chamber surrounding each of said orifices, a valve member within said chamber movable alternatively into engagement with one of said valve seats or the other, a diaphragm chamber, a diaphragm within said diaphragm chamber, rigid means extending between one face of said diaphragm and the side of said valve member facing the orifice which communicates with said exhaust port, means for connecting the region of said chamber adjacent to the other face of said diaphragm to a fluid amplifier outlet, and an opening between said valve chamber and diaphragm chamber, said opening being closed when said valve member closes said orifice communicating with said exhaust port but being otherwise open, whereby as said valve member moves from the pressure orifice toward the exhaust orifice pressurized working fluid can momentarily flow through said opening and against said one face of said diaphragm to thereby help exhaust the low pressure fluid adjacent to the other face of said diaphragm.

5. A valve as defined in claim 4 wherein said opening is formed at least in part of said exhaust orifice.

6. A valve as defined in claim 4 wherein said opening loosely accommodates said rigid connecting means, whereby the momentary flow of pressurized working fluid through said opening cushions said connecting means and protects it against wear.

7. A valve adapted to control the flow of a relatively high pressure working fluid in response to the relatively low pressure output of a fluid amplifier, comprising a valve body formed with at least one valve chamber, a pressure orifice and an exhaust orifice leading into said chamber on opposite sides thereof, pressure and exhaust ports for the working fluid communicating with said pressure and exhaust orifices, respectively, a third port communicating with said chamber, a valve seat within said chamber surrounding each of said orifices, a valve member within said chamber movable alternatively into engagement with one of said valve seats or the other, said valve member comprising a disk of rigid material, each face of said disk facing one of said orifices, and an annular member of resilient material carried on each face of said disk and projecting out of the plane of the disk face, and each valve seat being a flat region surrounding its respective orifice and adapted to be engaged by one of said annular members, a diaphragm chamber, a diaphragm within said diaphragm chamber, rigid means extending between one face of said diaphragm and the side of said valve member facing the orifice which communicates with said exhaust port, and means for connecting the region of said chamber adjacent to the other face of said diaphragm to a fluid amplifier outlet.

References Cited
UNITED STATES PATENTS

| | | | |
|---|---|---|---|
| 2,911,005 | 11/1959 | Adelson | 137—596.15 |
| 2,984,218 | 5/1961 | Christianson | 137—596.15 |
| 3,124,999 | 3/1964 | Woodward | 137—81.5 XR |
| 3,220,428 | 11/1965 | Wilkerson | 137—81.5 |
| 3,239,150 | 3/1966 | Chisel | 137—81.5 XR |
| 3,300,255 | 1/1967 | Racki | 137—596.18 XR |
| 3,354,908 | 11/1967 | Levesque | 137—81.5 XR |

SAMUEL SCOTT, *Primary Examiner.*

U.S. Cl. X.R.

137—81.5, 596.15